March 28, 1967 R. J. HOLTON ETAL 3,311,251
FASTENING DEVICES

Filed May 11, 1964 2 Sheets-Sheet 1

INVENTORS
ROBERT J. HOLTON
ALBERT T. BUTTRISS
BY
Jeare, Fetzer & Jeare
ATTORNEYS March 28, 1967  R. J. HOLTON ETAL  3,311,251
FASTENING DEVICES Filed May 11, 1964  2 Sheets-Sheet 2

INVENTORS
ROBERT J. HOLTON
ALBERT T. BUTTRISS
BY *Jeane, Fetzer & Jeane*

ATTORNEYS

United States Patent Office 3,311,251
Patented Mar. 28, 1967

3,311,251
FASTENING DEVICES
Robert J. Holton, Cleveland, and Albert T. Buttriss, Westlake, Ohio, assignors to Tinnerman Products, Inc., a corporation of Ohio
Filed May 11, 1964, Ser. No. 366,369
7 Claims. (Cl. 215—82)

This invention relates in general to fastening means and more particularly deals with the provision of an improved fastening device construction for mounting lids, covers, shields and like objects in place within a vessel, utensil or the like; or upon an apertured support, such as a panel.

More particularly, the invention is directed to an improved fastening device construction made from relatively thin sheet or strip material, such as sheet spring steel, sheet metal, cold rolled metal which is constructed and arranged for use in combination with lids, covers, shields or like objects, for permanently and positively mounting the same in applied position within a vessel, utensil or like object; or to an apertured support panel without danger of loosening or displacement therefrom due to vibration, jarring or any strain forces which may take place in the assembled parts.

In application herein, the fastening devices generally comprise a resilient body or base made from suitable sheet metal, strip or sheet which includes a flexible tongue and tab construction for facile attachment of the device to side wall portions of a protective member, such as a lid, cover, shield or the like, and which further includes a flexible finger construction extending from the base and adapted to be received in substantially snap-fastening relation with interior surface portions of a vessel, utensil or like object, or to an aperture in a support panel, for positively and permanently holding the parts together in assembled relation.

Accordingly, the present invention contemplates the provision of a relatively inexpensive fastening device construction which can be produced from sheet or strip metal having spring-like characteristics, and which is readily adapted for mounting protective member, such as a lid, cover, shield or like object to a vessel, utensil or the like; or for mounting such objects to an apertured support wall or panel.

Another object of the present invention is to provide an improved fastener device for mounting a protective member, such as a lid, cover, shield or like object, on a vessel or utensil; or to an apertured support wall or panel without danger of loosening or displacement therefrom due to vibration, jarring or stress and/or strain forces incident to usage thereof.

A more specific object of the present invention is to provide a fastening device of the character described which comprises a resilient body or base made from sheet metal or strip, including a flexible tongue and tab construction adjacent one end thereof adapted to be received through an opening in a protective member, such as a lid, cover, shield or like object, and further including a flexible finger construction adjacent the other end of the base adapted for snap-fastening relation with the confronting interior surface portions of a vessel, utensil or like object; or to an apertured support panel for holding the protective member in mounted relation within the vessel or utensil; or in applied position upon the panel.

Other features and advantages of the invention will be apparent from a consideration of the following description taken in conjunction with the accompanying drawings, wherein;

FIG. 3 is a fragmentary section view showing a plurality of the fastening devices of FIGS. 1 and 2 in applied position for retaining a lid or cover in closed position with a vessel, utensil or the like;

FIG. 6 is a fragmentary section view showing a plurality of the fastening devices of FIGS. 1 and 2 in applied position for retaining a lid, cover or the like in applied position within another modified form of vessel, utensil or the like;

Figure 3:
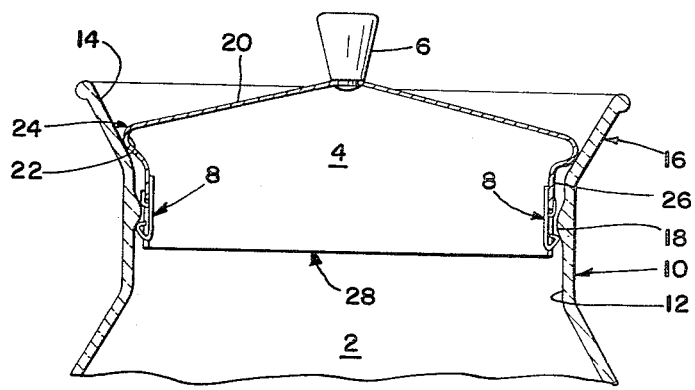

Referring to the drawings, FIG. 3 illustrates a generally cylindrical vessel or utensil 2 made from vitreous materials, such as glass or the like, which may be provided with a detachable cover or lid 4, preferably made of metal, plastic, wood or the like. The lid 4 in the embodiment shown may be provided with a handle 6 for purposes of carrying and/or transporting the vessel from one area to another. In the embodiment shown, the lid 4 is retained in closed position within the vessel 2 by means of a plurality of fastening devices, designated generally at 8. The fastening devices constructed in accordance with the present invention are preferably detachably secured to and in circumferentially spaced relation on the lid 4 for resilient coacting engagement with interior surface portions of the vessel 2 to prevent withdrawal of the lid from the vessel, as hereinafter will be more fully described.

As best illustrated in FIG. 3, the vessel 2 is generally of a conventional open top construction including at its upper end thereof, a generally circular, in cross section, reduced diameter neck 10 defined by an endless generally vertical extending side wall 12. The neck 10 flares upwardly and angularly outwardly as at 14, to provide an endless brim 16 which is similarly circular in cross-section. In the embodiment shown, the endless side wall 12 may be provided interior thereof with a generally centrally disposed, curve or bulbous annular rib 18. The rib 18 is preferably of a curved convex cross-section and extends radially inwardly from the side wall 12 by an amount sufficient to provide an abutment for engagement with predetermined resilient portions of the respective fastener devices.

The cover or lid 4 may be of any suitable shaped configuration for facile insertion within the vessel 2. In the form shown, the lid 4 includes a generally circular, in plan, upwardly arched or tent-shaped top 20 having an inturned marginal edge bent, as at 22, to provide an annular support shoulder 24. The annular shoulder 24 is of a relatively greater transverse dimension than the transverse dimension of neck 10 to provide an abutment for supporting the cover 4 interiorly of the brim 16. An endless, generally vertically extending side wall 26 depends downwardly from the annular shoulder 24 defining a generally cylindrical skirt 28 which is open at its lower end thereof. The skirt is of a relatively lesser transverse dimension than that of the annular shoulder 24 so as to be axially inserted within and removed from the neck 10 of the vessel 2.

Figures 4, 5:
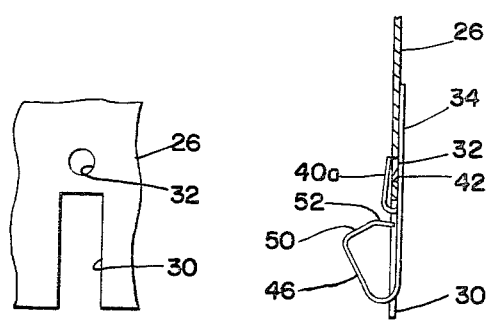
FIG. 4 is an enlarged fragmentary elevation view showing a portion of the side wall construction of the lid or cover of FIG. 3, and with the fastening device removed therefrom for purposes of clarity.
FIG. 5 is an enlarged fragmentary section view showing one of the fastening devices in applied position with the side wall of a lid or cover of FIG. 3.

As best shown in FIGS. 4 and 5, the side wall 26 defining the skirt 28 is provided with a pair of oppositely disposed slots 30. The slots 30 are preferably of a polygonal shape, such as rectangular, which open onto the lower circumferential marginal edge of the skirt 28 for the reception therethrough of predetermined portions of the fastening devices 8 which provide a resilient snap-fastening engagement with the annular rib 18 of the vessel 2. In the embodiment shown, the side wall 26 is further provided with openings or apertures 32 which are disposed a predetermined distance above and in axial alignment with each of the respective slots 30. The openings 32 are preferably circular in configuration for the reception therethrough of other predetermined portions of the fastener devices 8 for detachably retaining the latter in rigid stationary relation on the side wall 26.

Figure 1:
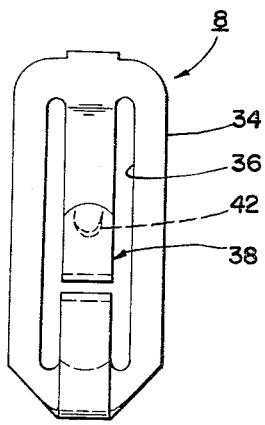
FIG. 1 is a top plan view of one embodiment of the improved fastening device made in accordance with the present invention.
Figure 2:
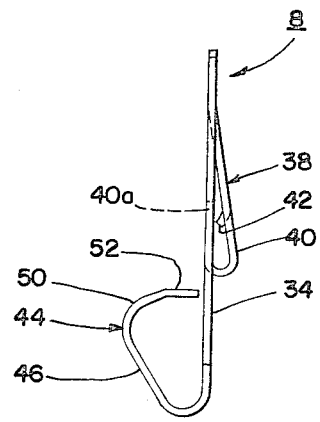
FIG. 2 is a side elevation view of the fastening device of FIG. 1.

The fastening devices 8, as best shown in FIGS. 1, 2 and 5, in one form of the invention are adapted for economical and quantity production from standard metal sheet or strip with little waste and may be facilely produced from any suitable metal material, preferably of a spring-like nature, such as spring steel or cold rolled metal having spring-like characteristics. The fastening devices 8 in the form shown, include a generally elongated body or base 34 formed from resilient sheet metal strip which will bear against confronting inner surface portions of the side wall 26 of the lid 4. The base 34 is preferably provided with a generally polygonal shaped slot 36, such as rectangular, which extends longitudinally substantially throughout a major portion of its length. In accordance with the present invention, the base 34 is provided adjacent one end thereof with a flexible tongue 38 formed by suitably cutting or slitting the material of the base and by bending the tongue thereby formed angularly outwardly away from the plane of the base, as shown in FIG. 2. The tongue 38 is defined by a resilient, generally planar arm portion 40 having an upturned portion 40a adjacent its free end bent over so as to extend in the same general direction, as the base 34, wherein the spacing between the arm 40 and upturned 40a portions is of a progressively lesser transverse dimension than the thickness of the side wall 26 for resiliently interlocking the fastening device to the lid 4 in the assembled position thereof.

To further secure frictional engagement with the side wall 26 of the lid 4, the tongue 38 may be provided with a tab 42 which may be depressed from the material of the arm 40 commencing at a point generally opposite the upper distal end of the upturned portion 40a. Commencing at such point, the tab 42 is bent angularly inwardly and downwardly away from the plane of the arm 40 toward the base 34. The tab 42 is preferably of a width and height sufficient to be disposed for coacting engagement within one of the openings 32 provided in the side wall 26 to retain the fastening device in stationary relation on the lid 4.

In the embodiment shown, the base 34 is provided adjacent its other end with a flexible, generally C-shaped finger, designated generally at 44. The finger in this form is approximately of the same transverse dimension as the tongue 38 and is of a slightly lesser transverse dimension than that of the elongated slots 30 provided in the side wall 26 of the lid 4. The finger is defined by an upturned bent portion 46, a generally planar portion 48 extending angularly upwardly and outwardly away from the plane of the base 34, an inturned bent portion 50, and another generally planar portion 52 which extends inwardly and generally normal to the plane of the base 34, and which portions coact together to define a shoulder-like abutment for snap-fastening coacting engagement with confronting interior surface portions of the vessel 2.

A typical application of the fastening devices, in one form of the invention, is shown in FIGS. 3 and 5 wherein the fastening devices 8 are assembled on the lid 4 for retaining the same in closed position within the vessel 2. Though for purposes of illustration only two fastening devices have been utilized for interlocking the lid with the vessel, it will be realized that any number and/or arrangement of such fastening devices may be advantageously utilized to achieve the necessary securement in accordance with the present invention. Each fastening device may easily and quickly be applied to the lid 4 by inserting the flexible finger 44 laterally through the elongated slot 30 in the side wall 26 and then by sliding the fastening device upwardly so that the upper marginal edge of the slot 30 will automatically be disposed between the resilient arm 40 and upturned 40a portions of the flexible tongue 38. Continued upward movement thereof causes the tab 42 to automatically snap into the opening 32 in the side wall 26 due to the resilient characteristics of the material, whereupon further upward movement of the fastening device will be arrested. In this final installed position, the side wall 26 will be engageably retained in tight fitting relation by the upturned bent portion 40a and the tab 42 of the tongue 38 to effectively prevent movement of the fastening device upwardly, downwardly, laterally or in any combination of such directions. With a predetermined number of fastening devices thus arranged, the lid 4 may then be placed within the vessel 2, wherein upon downward movement thereof, the laterally projecting flexible fingers 44 of each of the respective fastening devices will be pressed or cammed radially inwardly and over the high points of the curved or bulbous annular rib 18. Continued downward movement of the lid 4 causes the flexible fingers 44 to spring back under the rib 18 for automatic snap-fastening engagement of the lid 4 interiorly of the vessel 2. In such final installed position, the vessel 2 may be easily transported via the handle 6 without displacement or disengagement of the lid 4 from its secured position within the vessel 2 due to the cooperative resilient snap-fastening coaction of the fastening devices with the vessel.

Figure 6:
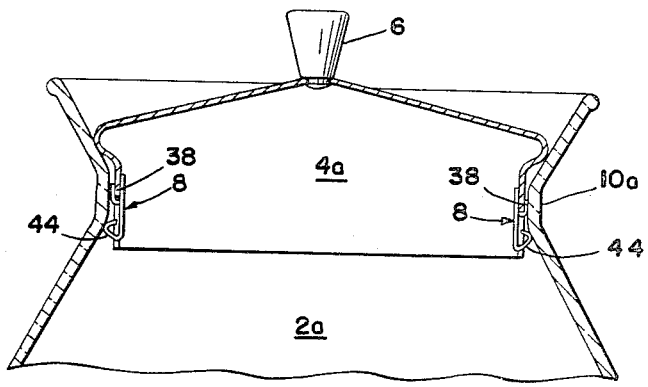

In another application, as shown at FIG. 6, the vessel, designated generally at 2a, is of a slightly different construction in that the reduced diameter neck 10a for interconnection with the upwardly and outwardly flared brim 16a is of a relatively lesser height as compared to that illustrated in FIG. 3. In this form, however, the neck 10a is shown absent the curved or bulbous annular rib 18 so that the resilient interlocking securement of the lid 4a within the vessel is achieved principally by the resilient spring characteristics of the flexible tongue 38 and finger 44 construction of the respective fastening devices 44 which engageably coact with confronting inner surface portions of the vessel 2a upon insertion of the lid 4a therein.

Figure 7:
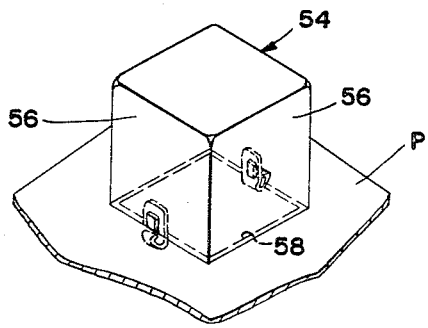
FIG. 7 is a fragmentary, generally perspective view showing another application of the fastening device of FIGS. 1 and 2 for mounting a protective member such as a cover, shield I.F. can or the like to an apertured support, such as a panel.
Figure 8:
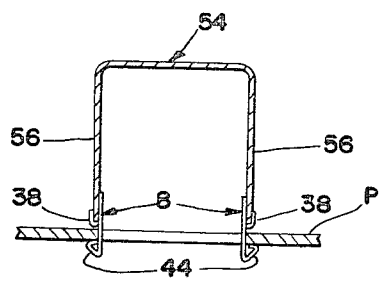
FIG. 8 is a fragmentary section view of the arrangement of FIG. 7, and showing the fastening devices in applied position in snap-fastening relation with the panel.

In FIGS. 7 and 8 there is illustrated another typical application of the fastening devices 8 for use in the facile attachment of a protective member 54, such as a cover, shield, I.F. can or the like, to a support member or panel P. In the embodiment shown, the member 54 is defined by vertically disposed side walls 56 which present approximately the same interior configuration, but with slightly greater treansverse dimensions compared to an opening 58 suitably provided in the panel P, thereby to prevent the entry of foreign or deleterious materials into the opening. In assembly, the fastening devices 8 are suitably applied to the side walls 56 in the manner as above described in connection with FIGS. 3 and 6. The protective member 54 and depending fastening devices 8 are then placed in registration over the opening 58 and pressed downwardly as a unit, whereby the laterally projecting flexible finger 44 of each of the respective fastening devices 8 is caused to spring or cam radially inwardly upon engagement with confronting marginal edge portions presented by the opening 58. Continued application of pressure to the member 54 causes the fingers 44 to snap back under the confronting underside of the panel P, whereupon the confronting marginal edge portions presented by the opening 58 will be engageably retained in snap-fastening relation between the flexible tongue 38 and finger 44 of each of the respective fastening devices for positive attachment of the member 54 to the panel P.

Figure 9:
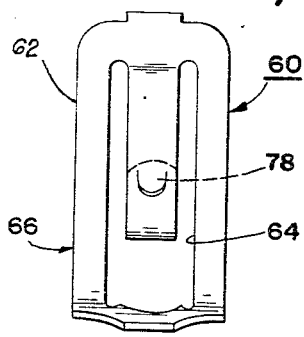
FIG. 9 is a top plan view showing a modified form of the improved fastening device made in accordance with the present invention.
Figure 10:
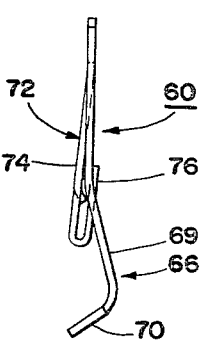
FIG. 10 is a side elevation view of the modified form of fastening device of FIG. 9.

In FIGS. 9 and 10 there is shown another form of the fastening device, designated generally at 60, which may also be advantageously utilized for attachment of a cover or lid to a vessel, as illustrated in FIGS. 3 and 6; or for attachment of a protective member to a support panel, as illustrated in FIGS. 7 and 8. The fastening device 60 in the form shown, includes a generally elongated body or base 62 formed from suitable sheet metal strip and having an elongated generally polygonal shaped slot 64, such as rectangular, formed therein and extending substantially throughout a major portion of the length of the base. However, in this form, the base 62 proper may be bent transversely to provide a flexible, generally L-shaped, in elevation, finger 66 adjacent one end thereof. The finger in this form is defined by an obliquely outwardly bent portion 69 commencing substantially adjacent the medial area of the base 62, and an inturned or reverse bent portion 70 which together present an abutment for snap-fastening coaction with a vessel, apertured support member or the like. Moreover, in this form the finger 66 is generally of the same transverse dimension as that of the base 62 itself, thereby to provide maximum strength, yet sufficient resilient characteristics for retaining engagement with confronting inner surface portions of a vessel for attachment of a cover or lid thereto; or for attachment of a protective member, such as an I.F. can or the like to an apertured support panel, as aforesaid.

In the form of FIGS. 9 and 10, the base 62 may be similarly provided adjacent the other end with a flexible tongue 72, formed by suitably cutting or slitting the material of the base and by bending the tongue 72 thereby formed angularly outwardly away from the plane of the base and generally opposite relative to bending of flexible finger 66. The tongue 72 is similarly defined by a resilient arm portion 74 and an upturned portion 76 adjacent the free end of the arm which is bent over so as to extend generally angularly inwardly in the same general direction of the base 62, wherein the spacing between the arm 74 and the upturned portion 76 approximates generally the thickness in horizontal cross-section of the vertical side wall of a cover, lid, protective member or the like, to which the fastening device may be applied. Here again, the tongue 72 may be provided with a tab 78 which is cut or slit out of the material of the arm 74 commencing at a point approximately opposite to the upper distal end of the upturned portion 76 and which tab is bent angularly inwardly away from the plane of the arm 74 for reception within an opening provided in the side wall of a vessel, protective member or the like, as aforesaid.

From the foregoing description and accompanying drawings, it can readily be seen that the present invention provides an improved fastening device including a flexible tongue and finger construction which can quickly and easily be applied to a lid, cover, shield or the like for attachment of the same or similar type articles to a container, vessel, utensil, support panel or the like by a simple snap-fastening operation to permanently hold the parts together; and which provides an expeditious arrangement that can be easily and quickly detached from such snap-fastening holding engagement as desired.

The terms and expressions which have been employed, are used as terms of description and not of limitation and there is no intention in the use of such terms and expressions of excluding any equivalents of any of the features described or shown or portions thereof, but it is recognized that various modifications are possible within the scope of the invention claimed.

We claim:
1. In a fastening assembly including an open top vessel or the like, a cover disposed within said vessel, said cover having a top and an endless generally vertically extending defining side wall, said side wall having a plurality of oppositely disposed slots and an aperture disposed above and in alignment with each of the respective of said slots, and a plurality of fastening clips attached to said side wall and disposed in snap-fastening relation with said vessel, each of said clips comprising, a base having an elongated opening therein disposed adjacent an interior surface portion of said side wall, a flexible tongue extending from one end of said base and generally longitudinally relative to said opening, said tongue having an upturned bent portion adjacent its free end thereof disposed in interlocking coacting engagement with a marginal edge portion of said side wall, and a flexible finger extending angularly outwardly from the other end of said base, said finger projecting laterally through one of the respective slots in said side wall and disposed in snap-fastening relation with an interior surface portion of said vessel for retaining said cover in mounted position in said vessel.

2. In a fastening assembly in accordance with claim 1, wherein said tongue is of a lesser transverse dimension than the transverse dimension of said base and includes a tab disposed in one of the respective apertures formed in said side wall for retaining the clip in stationary relation on said cover.

3. In a fastening assembly in accordance with claim 1, wherein said finger is of a lesser transverse dimension than the transverse dimension of said base and includes an upturned bent portion extending angularly outwardly from said base, and an inturned bent portion extending in the general direction of said base which together form an abutment for resilient snap-fastening engagement with confronting interior surface portions of said vessel.

4. In a fastening assembly in accordance with claim 1, wherein said finger is substantially the same transverse dimension as the transverse dimension of said base, and includes a portion of the base which is bent angularly outwardly therefrom commencing approximately adjacent the medial portion of said base, and a reverse bent portion extending generally inwardly toward said base which together form an abutment for resilient snap-fastening engagement with confronting interior suface portions of said vessel.

5. A sheet metal fastening device for mounting an object, such as a cover, shield, or the like, on a support member, such as a vessel, apertured panel or the like, said device comprising a flat base having an elongated slot therein, a resilient tongue struck-out from one end of said base, said tongue extending downwardly longitudinally of said slot and angularly outwardly from the general plane of said base, the tongue having an upturned bent portion adjacent to its free end extending upwardly and inwardly so as to be disposed generally in the plane of said base adapted for receiving an interlocking relationship therein a marginal portion of said object, a resilient finger struck-out of said base adjacent the end opposite said tongue, said finger including an upturned bent portion extending upwardly and angularly outwardly from the general plane of said base, and an inturned bent portion extending inwardly in the general direction of said base, said inturned portion disposed in overlying relationship relative to the slot in said base and being spaced in close proximity below the upturned portion of said tongue to provide an abutment adapted for snap-fastening engagement with said support member.

6. A fastening device in accordance with claim 5, wherein said tongue includes a tab disposed opposite said upturned portion adapted to be received in a complementary aperture in said object for retaining the device in a stationary relation on said object.

7. A fastening device in accordance with claim 5, wherein said tongue and finger are of substantially the same transverse dimension, said transverse dimension being substantially less than the transverse direction of said base.

References Cited by the Examiner
FOREIGN PATENTS
8,256 4/1894 Great Britain.

THERON E. CONDON, *Primary Examiner.*
J. B. MARBERT, *Assistant Examiner.*